US012651877B2

(12) United States Patent
Genau

(10) Patent No.: US 12,651,877 B2
(45) Date of Patent: Jun. 9, 2026

(54) HERMAPHRODITIC CIRCUIT BOARD PLUG CONNECTOR

(71) Applicant: HARTING ELECTRONICS GMBH, Espelkamp (DE)

(72) Inventor: Marc Genau, Luebbecke (DE)

(73) Assignee: HARTING ELECTRONICS GMBH, Espelkamp (DE)

( * ) Notice: Subject to any disclaimer, the term of this patent is extended or adjusted under 35 U.S.C. 154(b) by 393 days.

(21) Appl. No.: 18/017,839

(22) PCT Filed: Sep. 20, 2021

(86) PCT No.: PCT/DE2021/100765

§ 371 (c)(1),
(2) Date: Jan. 24, 2023

(87) PCT Pub. No.: WO2022/063361

PCT Pub. Date: Mar. 31, 2022

(65) Prior Publication Data

US 2023/0275379 A1 Aug. 31, 2023

(30) Foreign Application Priority Data

Sep. 23, 2020 (DE) ..................... 10 2020 124 836.9

(51) Int. Cl.
*H01R 24/84* (2011.01)
*H01R 12/71* (2011.01)
*H01R 13/11* (2006.01)

(52) U.S. Cl.
CPC ........... *H01R 24/84* (2013.01); *H01R 12/716* (2013.01); *H01R 13/112* (2013.01)

(58) Field of Classification Search
CPC .... H01R 12/716; H01R 24/84; H01R 13/112; H01R 13/6453; H01R 13/6456
See application file for complete search history.

(56) References Cited

U.S. PATENT DOCUMENTS 5,498,167 A * 3/1996 Seto ....................... H01R 24/84 439/74
6,461,177 B1 * 10/2002 Saka ................. H01R 13/6456 439/372
(Continued)

FOREIGN PATENT DOCUMENTS

DE 69423214 9/2000 ............ H01R 24/18
WO 9533290 12/1995 ............ H01R 23/68
(Continued)

OTHER PUBLICATIONS

Search Report issued in German Patent Appln. Serial No. 10 2020 124 836.9, dated Apr. 28, 2021, machine translation, 18 pages.
(Continued)

*Primary Examiner* — Renee S Luebke
*Assistant Examiner* — Paul D Baillargeon
(74) *Attorney, Agent, or Firm* — HAYES SOLOWAY P.C.

(57) ABSTRACT

In order to produce a circuit board plug connector in which the advantages of hermaphroditic plug connectors are combined with the advantages of conventional plug connectors, a contact carrier is equipped with both plug contacts of a first type and plug contacts of a second type in equal numbers. Advantageously, the plug contacts of the first type are designed as "male" contacts (blade contacts) and the plug contacts of the second type are designed as "female" contacts (fork contacts) and can be plugged into one another in principle.

12 Claims, 5 Drawing Sheets

(56) References Cited

U.S. PATENT DOCUMENTS

| | | | | |
|---|---|---|---|---|
| 7,503,807 | B2 * | 3/2009 | Martin | H01R 24/58 439/668 |
| 8,147,254 | B2 * | 4/2012 | Shuey | H01R 13/6456 439/74 |
| 8,827,569 | B2 * | 9/2014 | Yamada | H01R 24/84 385/56 |
| 9,748,698 | B1 | 8/2017 | Morgan et al. | H01R 13/6473 |
| 9,853,388 | B2 * | 12/2017 | Copper | H01R 13/11 |
| 10,396,481 | B2 | 8/2019 | Lauermann | H01R 12/73 |
| 10,553,972 | B2 | 2/2020 | Tamai | H01R 12/721 |
| 2006/0051987 | A1 * | 3/2006 | Goodman | H01R 24/84 439/74 |

FOREIGN PATENT DOCUMENTS

| | | | |
|---|---|---|---|
| WO | 2015081064 | 6/2015 | H01R 12/73 |
| WO | WO-2016096108 A1 * | 6/2016 | H01R 24/84 |

OTHER PUBLICATIONS

International Preliminary Report on Patentability issued in PCT/DE2021/100765, dated Mar. 28, 2023, 8 pages.

International Search Report and Written Opinion issued in PCT/DE2021/100765, dated Jan. 4, 2022, with English translation, 18 pages.

* cited by examiner

HERMAPHRODITIC CIRCUIT BOARD PLUG CONNECTOR

CROSS REFERENCE TO RELATED APPLICATION

This application is a 371 filing based on PCT International Patent Application Serial No. PCT/DE2021/100765, filed Sep. 20, 2021, which claims benefit of German Patent Application Serial No. 10 2020 124 836.9, dated Sep. 23, 2020, the contents of which are incorporated herein by reference.

BACKGROUND OF THE INVENTION

The invention relates to a hermaphroditic plug connector.

Hermaphroditic ("unisex") plug connectors are basically distinguished in that they can be plugged with a mating connector of the same type. Hermaphroditic plug connectors can be used, for example, in circuit board connection technology to connect two parallel circuit boards that are located, for example, in a so-called "mezzanine" arrangement.

One advantage of hermaphroditic circuit board plug connectors is that they have an optimum distribution of forces between plug and mating connector, e.g. with regard to their plug-in forces and/or their contact pressure forces in the plugged state. Another advantage is that their design only has to be worked out for a single connector during development. This means that they can be produced in a single design in twice as large quantities as if the plug and mating connector were designed differently. Also, in terms of logistics, especially on the user side, only one design has to be kept in stock. Naturally, it is never the case that there is an unequal number of connectors and mating connectors.

One disadvantage of hermaphroditic plug connectors is that their hermaphroditic plug contacts usually only make contact with each other on one side. This means, for example, that they forward the contact pressure forces on to the contact carrier or even to the circuit board connections, which are particularly sensitive. In addition, the shock and vibration stability of the plug connection is naturally lower in this case than for other circuit board plug connectors, such as a double-spring design or a pin-and-socket plug connection (male/female), in which the pin is held in a frictionally engaged manner in the socket.

BRIEF DISCUSSION OF THE PRIOR ART

In the prior art, circuit board plug connectors for connecting two circuit boards are known.

Document U.S. Pat. No. 9,748,698 B1 discloses a plug connector system for parallel circuit boards in which the plug and mating connector are designed very differently. The plug contacts of the plug and mating connector are also designed very differently. The plug contacts of the plug are obviously to be classified as "male" (blade contact/pin contact) and those of the mating connector as "female" (spring contact/socket contact).

Document U.S. Pat. No. 10,553,972 B2 describes a plug connector system in which the plug and mating connector are also designed very differently. The plug has several, in part different, spring contacts ("female"), which are designed in two different forms, namely mirror-inverted to each other, and are arranged alternately in the contact carrier.

The mating connector has blade contacts that are each plugged between two offset springs of the respective spring contact.

The disadvantage of these two designs is that such plugs and mating connectors have to be manufactured from a large number of different individual parts due to their different design, which increases the manufacturing effort and makes the plug connector system more expensive, as well as making logistics more difficult.

Document U.S. Pat. No. 10,396,481 B2 discloses a hermaphroditic plug connector system with two identical plug connectors, which have similar plug contact elements that can be plugged into each other according to a complex arrangement.

The disadvantage here is that the design of the plug contact elements is extremely complex and correspondingly expensive. Each plug contact element has a complex spring system with several springs/contact springs.

The German Patent and Trade Mark Office has searched the following prior art in the priority application for the present application: DE 694 23 214 T2, U.S. Pat. No. 9,748,698 B1, U.S. Pat. No. 10,396,481 B2, U.S. Pat. No. 10,553,972 B2, WO 95/33290 A1 and WO 2015/081064 A1.

OBJECT OF THE INVENTION

The problem addressed by the invention is to reduce the manufacturing effort of a hermaphroditic circuit board plug connector. In particular, the aim is to specify an inexpensive design for a circuit board plug connector which combines the advantages of a hermaphroditic plug connector described at the outset with high shock and vibration stability and, in particular, also reduces the effect of contact pressure forces on the circuit board connections.

SUMMARY OF THE INVENTION

A circuit board plug connector has a contact carrier and a plurality of plug contacts of the first type and second type held by means of the contact carrier. The plug contacts of the first and second type each have at least one connection region and one plug region and differ from one another here at least by the shape of their respective plug regions. The contact carrier has a connection portion and a plug portion. The plug contacts of the first and second type are each guided with their connection regions through the connection portion of the contact carrier and are arranged with their plug regions in the plug portion or project with their plug regions at least into the plug portion of the contact carrier.

According to the invention, the number of plug contacts of the first type of the circuit board plug connector matches the number of plug contacts of the second type of the circuit board plug connector.

The plug regions of the plug contacts of the first type are pluggable with the plug regions of the plug contacts of the second type.

The circuit board plug connector is of hermaphroditic design, i.e. it can be plugged with another similar circuit board plug connector, also referred to hereinafter as a mating connector.

In the plugged state, a plug contact of the first type is plugged with a plug contact of the second type.

Advantageous embodiments of the invention are given in the dependent claims and the following description.

The connection region of the plug contacts is used for connection, e.g. for soldering, on a corresponding circuit board, in particular on connection pads provided for this purpose. By plugging their plug regions, the plug contacts can electrically conductively connect the circuit boards, in particular their connection pads.

In an advantageous embodiment, the plug contacts of the first type are formed as "male" contacts and the plug contacts of the second type are formed as "female" contacts. This provides a particularly high level of plugging reliability with regard to shocks and vibrations, since the male contact is held securely in the female contact. The contact pressure forces of the male contact can act here in opposite directions on the female contact and thus compensate each other within the contact arrangement and are thus kept away from the connection regions and/or the contact carrier. This even has the particular advantage that plug contact pairs with especially high contact pressure forces can be used because no consideration needs to be given to the—in this design non-existent or at least largely reduced—load on the circuit board connections and/or contact carrier.

In particular, the plug contacts of the first type can each have a blade contact at their plug region, and the plug contacts of the second type can each have two spring contacts at their plug region, with which they form a fork contact in particular. In the plugged state, for example, one blade contact of a plug contact of the first type can be received between two spring contacts of a fork contact and electrically conductively connected thereto. This allows a very precisely defined and, if necessary, also very high contact pressure force. A plug connection with particularly good electrical conductivity is also made possible. At the same time, the respective contact pressure forces within the individual plug contacts compensate for each other.

In a preferred embodiment, the plug contacts may be stamped-and-bent parts. These can be stamped out from spring-elastic sheet material. The plug contacts can be formed here, in particular stamped and bent, so that they make contact with each other over a large area in the sheet plane and/or on the stamped edge. Contacting both sides in the sheet plane can advantageously ensure a large mechanical tolerance range for large-area connections in addition to high electrical conductivity. Contacting on the stamped edge, on the other hand, allows the contact pressure forces to be distributed and the plug-in forces to be influenced in an excellently adjustable manner as a result of the stamping die. In particular, it is especially advantageous if one of the plug regions involved makes contact on its stamped edge and the other on its sheet plane, because this allows the two aforementioned advantages to be combined.

In a preferred embodiment, the sheet plane of the plug regions of the contacts of the first type in the plug portion of the contact carrier can therefore be oriented perpendicularly to the sheet plane of the plug regions of the contacts of the second type. In particular, the blade contact can then be inserted flat between the two contact tongues of the fork contact and thus can be received between them in a frictionally engaged manner.

The contacts of the first type then in turn make flat contact with one or more stamped edges of the contacts of the second type. In terms of construction, this has the advantage that the plug contacts have a relatively large degree of freedom in their positioning. In the plane of the contacts of the second type, in particular the fork contacts, for example, a sufficiently large insertion region can be created by their stamped contour. At right angles to this, the blade contacts naturally have a width which can be adjusted by their stamping shape and over which a desired tolerance can be realized.

It is particularly advantageous if the contact carrier has two guide webs in its plug portion for each fork contact. In each guide web there can then be arranged a guide slot, in each of which guide slots one of the spring contacts of the plug contact of the second type is received in portions and is held in a spring-loadable manner.

This is particularly advantageous because, on the one hand, it allows the spring contacts to be guided and, on the other hand, it ensures a deformability in their sheet plane without the spring contacts being able to break loose or give way laterally. The use of the guide webs also allows a particularly flexible contact arrangement within the plug portion of the contact carrier, for example a checkerboard pattern of contacts of the first and second type.

The two spring contacts of each fork contact can each have a contact region for electrical and mechanical contacting of the blade contact. This contact region can be arranged on the stamped edge of the respective spring contact.

For this purpose, the two opposing spring contacts arranged in the guide webs can protrude from the guide slot with their contact regions, at least in the unplugged state. In particular, their contact regions are directed here towards each other.

This arrangement advantageously allows the contacting of the plug region of the plug contact of the first type, which is preferably oriented in its sheet plane perpendicularly thereto, in particular formed as a blade contact.

In a preferred embodiment, the plug regions of the plug contacts of the first and second types are arranged in the plug portion of the contact carrier in a plurality of rows and, in this case, alternately in each row, in particular in said checkerboard pattern.

This is facilitated or even made possible by said guide webs. Lastly, sufficient space can remain between the adjacent guide webs of a row for one blade contact each.

In particular, for this purpose a gap between two guide webs can correspond to at least the width of a guide web. This improves the pluggability with a connector of the same type because the guide webs of one plug connector can engage at least in portions in the corresponding gaps of the respective other plug connector of the same type.

In particular, the plug regions of the plug contacts of the first and second type can be arranged in the plug portion of the contact carrier in said checkerboard pattern. This allows a particularly homogeneous distribution of the plug contacts, which is advantageous in many respects, for example for homogeneous distribution of plugging and unplugging forces and/or for increasing clearance and creepage distances.

The plug regions of the plug contacts in the plug portion of the contact carrier can be arranged in two rows in an embodiment which is expedient for many cases. Then, in accordance with the aforementioned disclosure, they can be arranged, for example, in each row alternately and, in particular, offset with respect to one another in order to implement a hermaphroditic plug portion. In that case, it is a double-row checkerboard pattern.

In an advantageous embodiment, the plug connector together with another plug connector of the same type can be used to electrically conductively connect two parallel circuit boards, i.e. electrical conductor tracks of the two parallel circuit boards.

For this purpose, it is advantageous if the plug portion and the connection portion of the respective contact carrier are arranged opposite each other.

Lastly, a system formed of such a circuit board plug connector and a further circuit board plug connector of the same type as the mating connector is disclosed, wherein the circuit board plug connector is pluggable with the mating connector.

In a preferred embodiment, both circuit board plug connectors are straight with their plug and connection portion of their contact carrier as well as their plug contacts and are thus able to connect two circuit boards arranged opposite each other in parallel.

In another embodiment, the two circuit board plug connectors are angled circuit board plug connectors. In these angled circuit board plug connectors, the plug portion and the connection portion of the contact carrier are arranged at right angles to each other and their plug contacts are angled, i.e. their plug region and their connection region are each oriented at right angles to each other. Two such angled circuit board plug connectors can be used, for example, to interconnect two circuit boards which are not only arranged in parallel but, moreover, in a common plane next to each other. For this purpose, these right-angled plug connectors are then expediently attached to the circuit board edge of the respective circuit board.

Furthermore, an arrangement is also possible in which the angled circuit board plug connector together with the straight circuit board plug connector can connect two circuit boards arranged at right angles to each other. Although these two circuit board plug connectors do not completely match each other in this case, they would—each considered separately—be regarded as hermaphroditic, since they are basically pluggable with a plug connector of the same type in each case.

Lastly, the plug face of a hermaphroditic plug connector must be of such symmetrical design that plugging with a plug connector of the same type is possible in principle. This means that such a plug connector can also be plugged, for example, with a mating connector that differs from it in the orientation of its connection portion, but not in the shape of its plug portion.

BRIEF DESCRIPTION OF THE DRAWINGS

An exemplary embodiment of the invention is shown in the drawings and is explained in greater detail below, in which.

DETAILED DESCRIPTION OF THE INVENTION

Figure 1A:
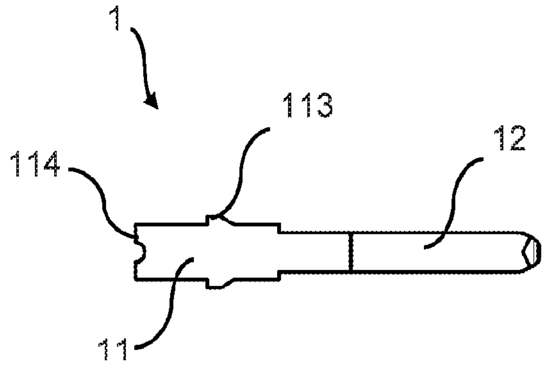
FIGS. 1*a-d* show a plug contact of the first type.
Figure 1B:
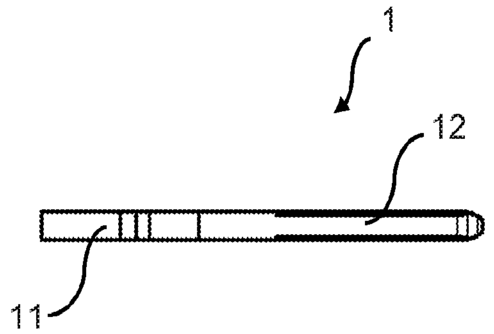
Figure 1C:
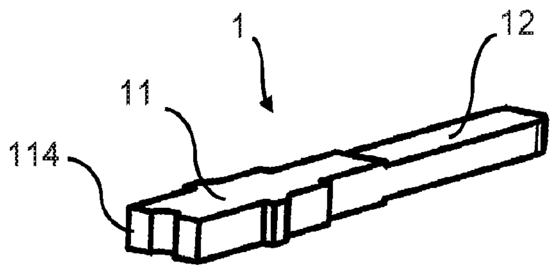
Figure 1D:
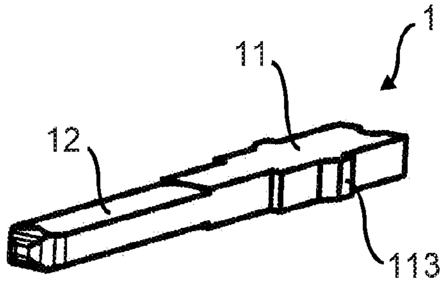

The figures contain partially simplified, schematic representations. Sometimes, identical reference signs are used for like but possibly non-identical elements. Different views of like elements could be scaled differently.

FIGS. 1*a* to 1*d* show a plug contact of the first type 1 from four different views. This is formed as a stamped-and-bent part and is stamped out of a sheet which can be spring-elastic but does not necessarily have to be. It has a connection region 11 and a plug region 12, which lie on an imaginary plug axis running in the plug-in direction, which is not drawn for the sake of clarity. The plug region 12 is formed as a blade contact and is thus "male". Furthermore, the plug contact of the first type 1 has two opposite latching ribs 113 on its connection region 11 for latching in a contact carrier 3. Opposite its plug region 12, it has a circuit board connection 114 for soldering or other electrical contacting on a circuit board. Thus, this plug contact of the first type 1 is a straight plug contact.

In other embodiments, an otherwise comparable plug contact of the first type could be bent perpendicularly to the sheet plane between its connection region 11 and its plug region 12, or alternatively it could be designed to be angled within the sheet plane due to its stamped form, so that it would then be an angled plug contact in each case.

Figure 2A:
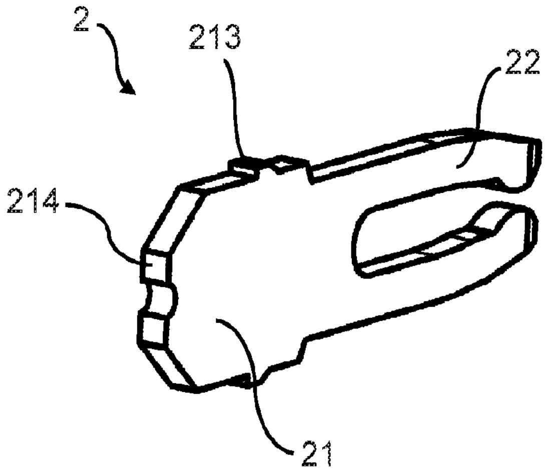
FIGS. 2*a, b* show a plug contact of the second type.
Figure 2B:
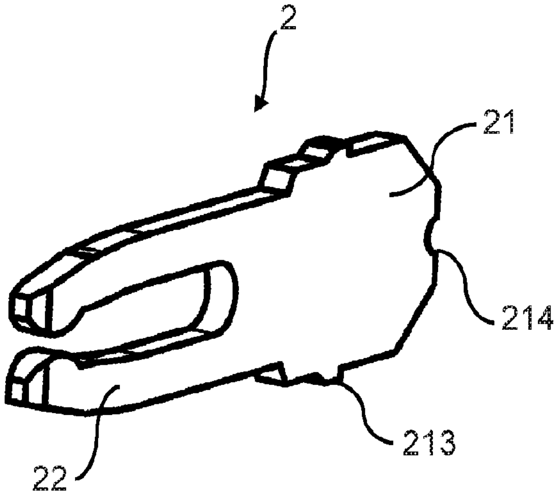

FIGS. 2*a* and 2*b* show a plug contact of the second type 2 in two different views. This is formed as a stamped-and-bent part and is stamped out from a spring-elastic sheet. It has a connection region 21 and a plug region 22 opposite. The plug region 22 is formed as a fork contact and thus has two spring contacts which are arranged and formed symmetrically with respect to a plug axis which is not shown for reasons of clarity.

The connection region 21 has two latching ribs 213 opposite each other, shown at the top and bottom of the drawing respectively, for latching in a contact carrier 3. The connection region 21 has, opposite the plug region 22, a circuit board connection 214 for soldering or otherwise electrically contacting a circuit board 4. Thus, the plug contact of the second type 2 shown here is also a straight plug contact.

In alternative embodiments, an otherwise comparable plug contact of the second type could be stamped out at an angle between its connection region 21 and its plug region 22 within the sheet plane in accordance with its stamping shape, or the plug region 22 could alternatively be bent at a right angle with respect to the connection region 21 perpendicularly to the sheet plane, so that it would then in each case be an angled plug contact of the second type.

Figure 3:
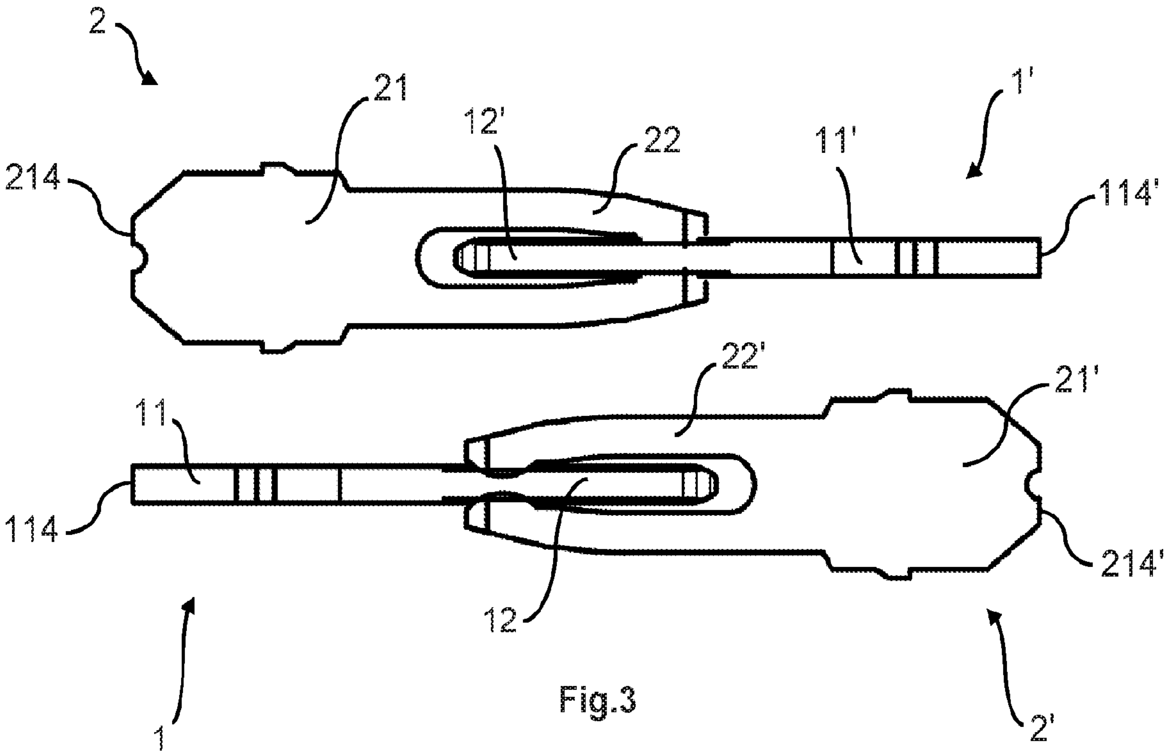
FIG. 3 shows an arrangement of two plug contacts of the first type and two plug contacts of the second type in the plugged state.

FIG. 3 shows an arrangement of two plug contacts of the first type 1, 1' and two plug contacts of the second type 2, 2' in the plugged state. It is noticeable here that the two plug contacts of the first type 1, 1' are arranged and oriented opposite to each other and that the two plug contacts of the second type 2, 2' are also arranged and oriented opposite to each other.

In fact, one plug contact of the first type 1 and one plug contact of the second type 2 (shown on the left in the drawing) each belong to a first circuit board plug connector. The other plug contact of the first type 1' and the second type 2' (shown on the right) belong to a second circuit board plug connector which is identical to the first circuit board plug connector. Although the plug contacts of the first type 1, 1' and second type 2, 2' are fundamentally different, the whole arrangement is hermaphroditic.

Figure 4A:
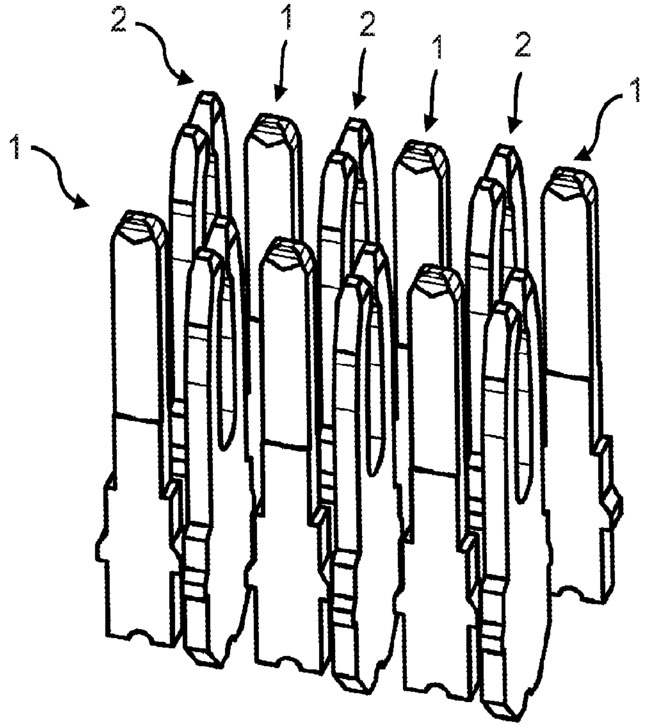
FIG. 4*a* shows a group of multiple plug contacts of the first and second type.

FIG. 4*a* shows a group of plug contacts of the first type 1 and second type 2 belonging to the first circuit board plug connector. These are arranged in two rows alternating in a checkerboard pattern with their plug axes parallel to each other.

Figure 4B:
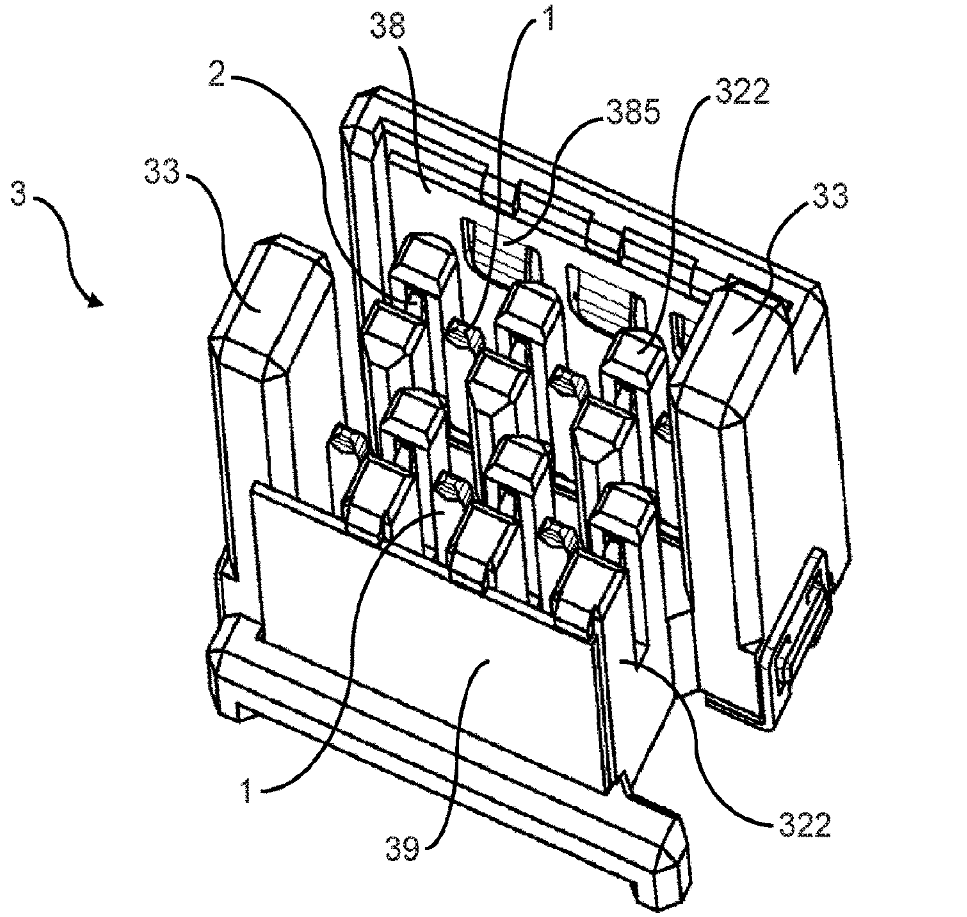
FIG. 4*b* shows a contact carrier with plug contacts of the first and second type received therein in an oblique plan view of its plug region.

In FIG. 4*b*, a first contact carrier 3 is shown in which the group of plug contacts 1, 2 is inserted in their arrangement described above.

For each plug contact of the second type 2, the contact carrier 3 has two guide webs 322 for receiving their plug regions 22, which are formed as fork contacts. For this purpose, in each of these guide webs 322 there is arranged a slot, in which in each case one of the spring contacts of the fork contact is arranged in a spring-loadable manner.

The plug contacts of the first type 1 are each arranged between the guide webs 322 of adjacent plug contacts of the second type 2, in order to allow the highest possible packing density.

Furthermore, the contact carrier has polarization bars 33 for correct positioning with respect to a further, similar circuit board plug connector, which will also be referred to below, in accordance with its function, as a mating connector, since it can be plugged with the circuit board plug connector.

Furthermore, two opposing shield plates 38, 39 of the contact carrier 3 are clearly visible in this illustration, namely a first shield plate 38 and a second shield plate 39. Contact lugs 385 are stamped out of the first shield plate and make electrical contact with the second shield plate 39' of a mating connector of the same type when plugged.

Figure 4C:
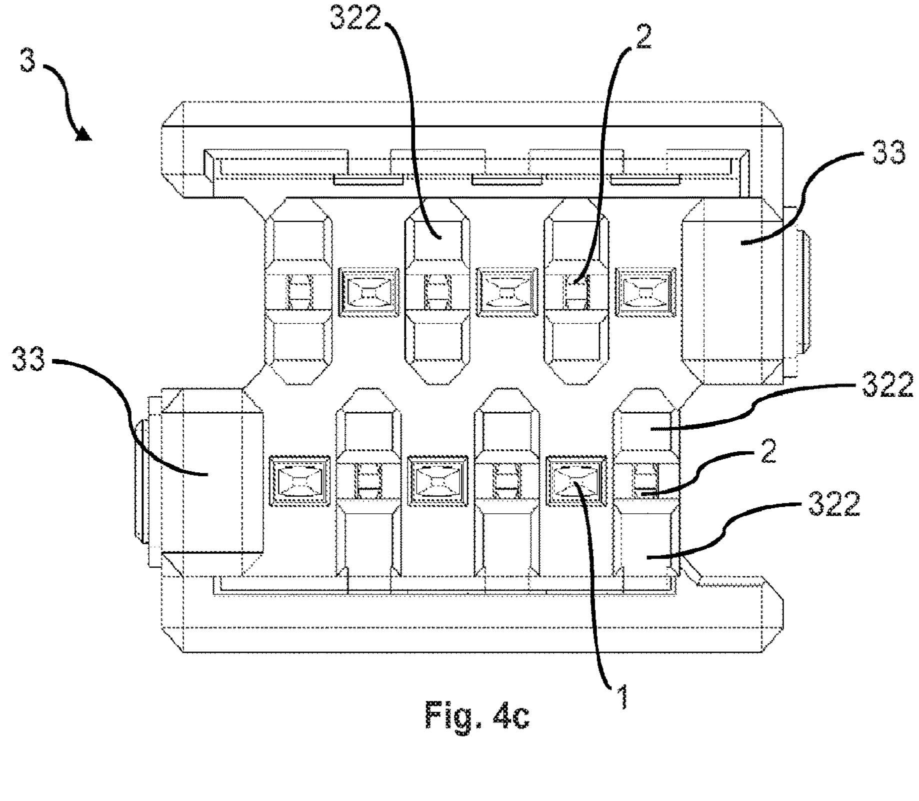
FIG. 4*c* shows the contact carrier in a straight plan view.

In FIG. 4*c*, this arrangement of the plug contacts 1, 2 in the contact carrier can be seen particularly well with a frontal view of its plug face. The viewing direction is in the plug-in direction, i.e. in the direction of said plug axes (not drawn) of the plug contacts 1, 2.

Furthermore, the hermaphroditic nature of this circuit board plug connector becomes particularly clear from this illustration. Due to the diagonal arrangement of the polarization bars 33 shown, plugging with a similar mating connector rotated about a vertical axis or about a horizontal axis is possible. However, if both polarization bars 33 were arranged on a single side, each in a different design, plugging would only still be possible in a single orientation. By contrast, in another conceivable design, plugging with a mating connector rotated even in three orientations would be possible without the polarization bars 33 at all, because, specifically in relation to the circuit board plug connector, in addition to the rotations mentioned (vertical and horizontal), the mating connector is also in a rotation about a central, horizontal axis running in the plug-in direction.

The aforementioned checkerboard pattern allows the aforementioned arrangement to be plugged in all three conceivable variants of rotation by 180°. The selection of the desired option(s) can be adjusted, as mentioned above, by the arrangement of the polarization bars.

Figure 5A:
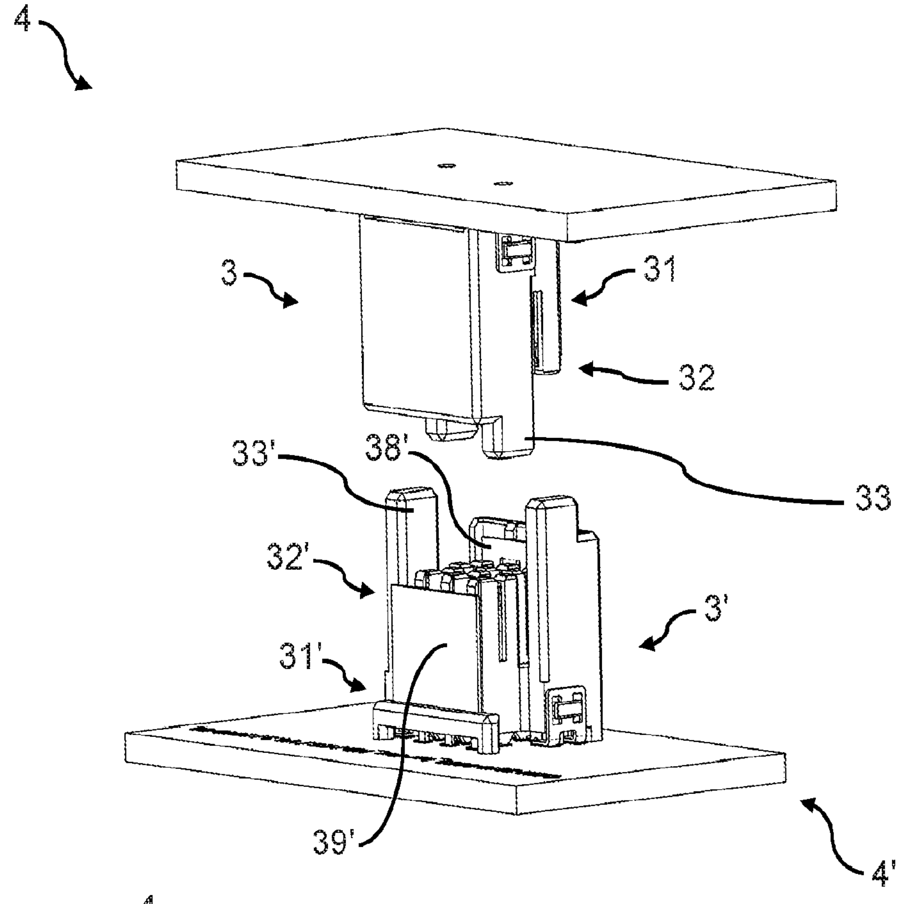
FIGS. 5*a-c* shows an arrangement of two parallel circuit boards and two associated circuit board plug connectors in the unplugged and plugged states.

FIG. 5*a* shows the circuit board plug connector and the mating connector of the same type, each mounted on and connected to a circuit board 4, 4', in the unplugged state. The two shield plates 38', 39' of the mating connector are also clearly visible.

Figure 5B:
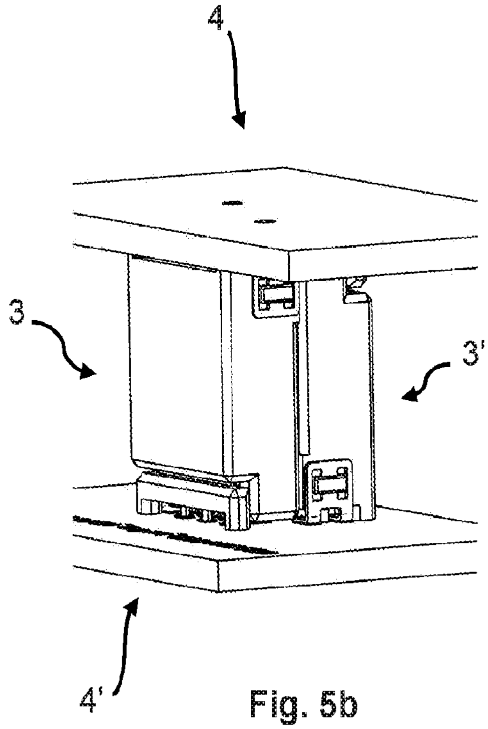
Figure 5C:
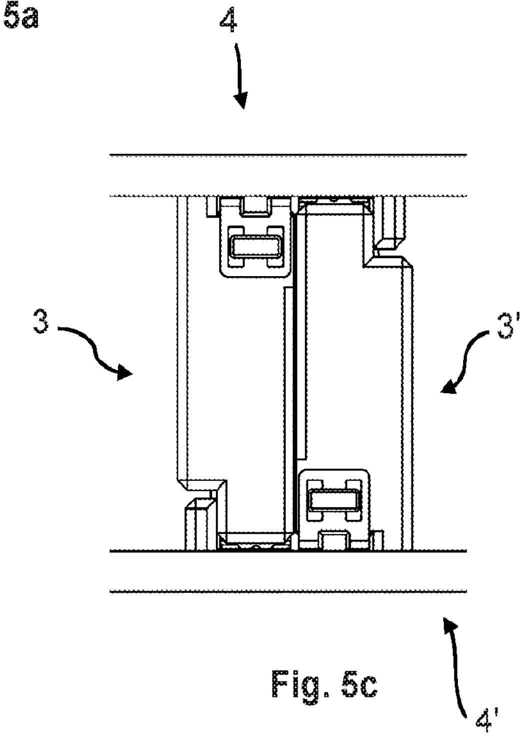

FIGS. 5*b* and 5*c* show the same arrangement in the plugged state from two different perspectives.

Figure 6:
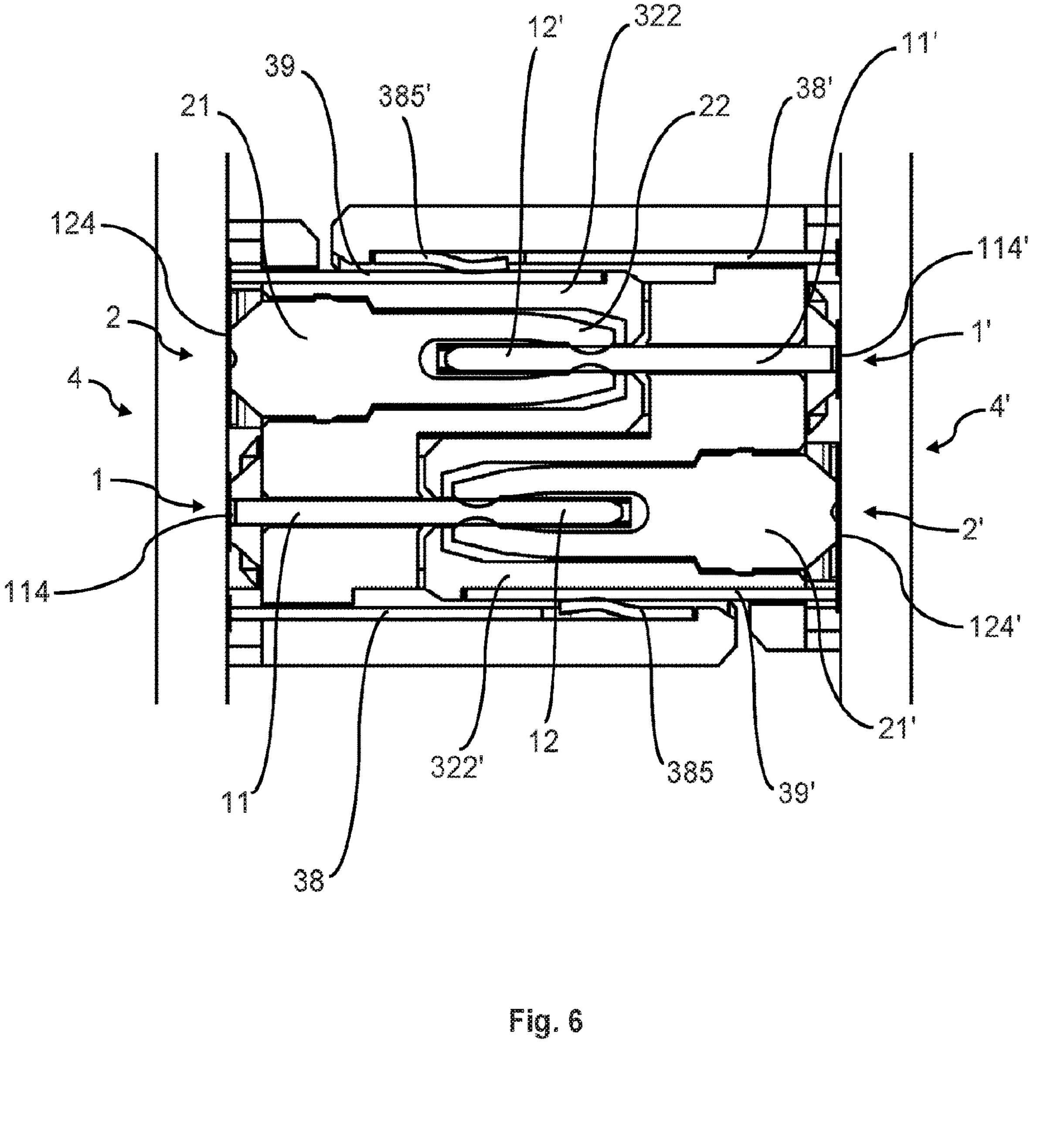
FIG. 6 shows the plugged arrangement in a sectional view.

Each contact carrier 3, 3' has a respective connection portion 31, 31' adjacent to the respective circuit board 4, 4' and a plug portion 32, 32' on the plug side. As can already be seen from the previous illustrations, the plug contacts 1, 1', 2, 2' are on the one hand guided with their connection regions 11, 11', 22, 22' through the respective connection portions 31, 31' of their contact carriers 3, 3' for contacting the respective circuit board 4, 4" and are soldered, pressed or otherwise contacted to the respective circuit board 4, 4', On the plug side, their plug regions 12, 12' project into the plug portion 32, 32' of their respective contact carrier 3, 3', wherein the second plug regions 22, as described above, are arranged in a spring-loadable manner with the spring contacts of their fork contacts at least in portions in the guide webs 322, 322', FIG. 6 shows a sectional view of the aforementioned plugged arrangement.

On the first circuit board 4, the plug contacts 1, 2 of the circuit board plug connector are soldered with their connection regions. Furthermore, their connection regions 11, 21 are guided through and held in the connection portion 31 of the contact carrier 3, which is not described here in greater detail for reasons of clarity.

The plug contacts 1', 2' of the mating connector 3' with their connection regions 11', 21' are soldered to the second circuit board 4'. Furthermore, their connection regions 11', 21' are guided through and held in the connection portion 31' of the contact carrier 3', which is not described in here in greater detail for reasons of clarity.

The plug contact of the first type 1, 1' of both circuit board plug connectors are inserted in opposite directions with their respective plug regions 11, 11' formed as blade contacts into the plug regions 22, 22', formed as fork contacts, of the respective other plug connector and are plugged into the respective fork contact 22, 22' between its two spring contacts for reliable electrical contacting. For their part, the spring contacts are mechanically guided by means of the guide webs 322, 322' of the respective contact carrier 3, 3' and thus prevented from moving sideways. In the unplugged state, their contact surfaces, which are shown here as an overlap with the blade contact 12, 12', protrude from the guide webs 322, 322' and are held in a spring-loadable manner in the respective guide web 322, 322'.

It is easy to see that in this way no contact pressure forces act on the circuit boards 4, 4' and/or on the circuit board connections 114, 114', 214, 214', and/or on the contact carriers 3, 3', because these forces already compensate each other within the plug contacts 1, 2, in particular within the fork contacts 22, 22' of the plug contacts of the second type 2. At the same time, the plug connector is hermaphroditic because it can be plugged with the mating connector 3' of the same type.

The first 38, 38' and second 39, 39' shield plates of both contact carriers 3 are soldered, pressed or otherwise electrically connected on the connection side to ground connections of the respective circuit board 4, 4'.

Both contact carriers 3, 3' each have said two shield plates 38, 39, 38', 39'. In the plugged state shown here, the contact tabs 385, 385' of the respective first shield plate 38, 38' make electrical contact with the respective second shield plate 39, 39' of the respective other contact carrier 3, 3' in order to ensure continuous, common grounding and shielding, on both sides, of the two circuit board plug connectors plugged with each other and their respective circuit boards 4, 4'. For this purpose, it is expedient that at least the first shielding plate 38, 38' has spring-elastic properties.

Even though various aspects or features of the invention are each shown in combination in the figures, it is apparent to a person skilled in the art-unless otherwise indicated—that the combinations shown and discussed are not the only possible ones. In particular, corresponding units or feature complexes from different exemplary embodiments may be interchanged.

LIST OF REFERENCE SIGNS

1, 1' plug contact of a first type ("male")
11,11' connection region of the plug contact of the first type
113 latching ribs
114 circuit board connection
12, 12' plug region of the plug contact of the first type/blade contact
2, 2' plug contact of a second type ("female")
21,21' connection region of the plug contact of the second type
213 latching ribs
214 circuit board connection
22,22' plug region of the plug contact of the second type/fork contact
3, 3' contact carrier
31, 31' connection portion
32, 32' plug portion
322, 322' guide webs
33, 33' polarization bars
38, 38' first shield plate
385, 385' latching spring
39, 39 second shield plate
4, 4' circuit board

The invention claimed is:

1. A circuit board plug connector, comprising
a contact carrier and a plurality of plug contacts of a first type and a second type held by the contact carrier, wherein
the plug contacts of first and second type each have at least one connection region and a plug region, wherein
the plug contacts of the first type and second type differ from one another at least by the shape of their respective plug region, wherein
the contact carrier has a connection portion and a plug portion, wherein
the plug contacts of the first type and second type are guided with their connection regions through the connection portion of the contact carrier, and are arranged with their plug regions in the plug portion of the contact carrier or at least project into the plug portion;
wherein
the number of plug contacts of the first type corresponds to the number of plug contacts of the second type; in that
the plug regions of the plug contacts of the first type are pluggable with the plug regions of the plug contacts of the second type;
wherein the circuit board plug connector is of hermaphroditic design, so that it can be plugged in with a further, similar circuit board plug connector, wherein, in the plugged state, a plug contact of the first type is plugged in with a plug contact of the second type,
wherein the plug contacts of the first type are formed as "male" contacts and the plug contacts of the second type are formed as "female" contacts,
wherein the plug contacts of the first type each have a blade contact at their plug region, and wherein the plug contacts of the second type each have, at their plug region, two spring contacts with which they form a fork contact, so that, in the plugged-in state, a blade contact of a plug contact of the first type is received in a fork contact of a plug contact of the second type between the spring contacts thereof and is electrically conductively connected thereto,
wherein the contact carrier has two guide webs in its plug region for each fork contact, wherein a guide slot is arranged in each guide web, in each of which guide slots one of the spring contacts of the plug contact of the second type is received at least in portions and is held in a spring-loadable manner,
wherein polarization bars are diagonally arranged and configured to allow a single orientation plugging, and
wherein the polarization bars extend beyond the guide webs along a mating direction of the circuit board plug connector.

2. The circuit board plug connector as claimed in claim 1, wherein a plug contacts of the first type and second type are stamped out from sheet material, wherein a sheet plane of the plug regions of the plug contacts of the first type in the plug portion of the contact carrier is oriented perpendicularly to the sheet plane of the plug regions of the plug contacts of the second type.

3. The circuit board plug connector as claimed in claim 2, wherein at least the sheet from which the plug contacts of the second type are stamped out has spring-elastic properties.

4. The circuit board plug connector as claimed in claim 1, wherein the two spring contacts of each fork contact each have a contact region for electrical and mechanical contacting of the blade contact that is to be plugged or that is plugged therewith, wherein these contact regions are arranged on a stamped edge of the respective spring contact.

5. The circuit board plug connector as claimed in claim 4, wherein the two opposing spring contacts arranged in the guide webs protrude with their said contact regions from the respective guide slot, at least in the unplugged state, and are thus directed towards each other.

6. The circuit board plug connector as claimed in claim 1, wherein the plug regions of the plug contacts of the first type and second type are arranged in the plug portion of the contact carrier in a plurality of rows and alternately within each row.

7. The circuit board connector as claimed in claim 6, wherein the plug regions of the plug contacts of the first type and second type are arranged in a checkerboard pattern in the plug portion of the contact carrier.

8. The circuit board plug connector as claimed in claim 7, wherein the plug regions of the plug contacts of the first type and second type are arranged in two rows in the plug portion of the contact carrier.

9. The circuit board plug connector as claimed in claim 6, wherein the plug regions of the plug contacts of the first type and second type are arranged in two rows in the plug portion of the contact carrier.

10. The circuit board plug connector as claimed in claim 1, wherein the connection portion and the plug portion of the contact carrier are arranged opposite each other so that the circuit board plug connector is straight.

11. The circuit board plug connector as claimed in claim 1, wherein the plug region and the connection region are arranged at right angles to each other so that the circuit board plug connector is angled.

12. A system formed of a circuit board plug connector as claimed in claim 1, and a further mating plug connector similar thereto, wherein the circuit board plug connector is pluggable with the mating plug connector.

* * * * *